US012283284B2

(12) United States Patent
Hantrakul et al.

(10) Patent No.: US 12,283,284 B2
(45) Date of Patent: Apr. 22, 2025

(54) METHOD AND SYSTEM FOR REAL-TIME AND LOW LATENCY SYNTHESIS OF AUDIO USING NEURAL NETWORKS AND DIFFERENTIABLE DIGITAL SIGNAL PROCESSORS

(71) Applicant: Lemon Inc., Cayman Islands (KY)

(72) Inventors: Lamtharn Hantrakul, Singapore (SG); David Trevelyan, London (GB); Haonan Chen, Beijing (CN); Matthew David Avent, London (GB); Janne Jayne Harm Renée Spijkervet, London (GB)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 17/748,882

(22) Filed: May 19, 2022

(65) Prior Publication Data

US 2023/0377591 A1 Nov. 23, 2023

(51) Int. Cl.

*G10L 19/00* (2013.01)
*G10L 21/0264* (2013.01)
(Continued)

(52) U.S. Cl.

CPC .......... *G10L 21/0264* (2013.01); *G10L 21/04* (2013.01); *G10L 25/18* (2013.01); *G10L 19/00* (2013.01); *G10L 25/90* (2013.01)

(58) Field of Classification Search

CPC ......... G10L 25/90; G10L 19/00; G10L 19/18; G10L 19/10; G10L 19/02; G10L 2025/935

See application file for complete search history.

(56) References Cited

U.S. PATENT DOCUMENTS 6,963,833 B1 * 11/2005 Singhal .................... G10L 25/90 704/207
2001/0023396 A1 * 9/2001 Gersho .................... G10L 19/10 704/E19.041

(Continued)

FOREIGN PATENT DOCUMENTS

WO WO-2019139430 A1 * 7/2019 ............... G06N 3/04

OTHER PUBLICATIONS

Engel et al., "DDSP: Differentiable Digital Signal Processing," International Conference on Learning Representations 2020, Jan. 14, 2020, 19 pages.

(Continued)

*Primary Examiner* — Feng-Tzer Tzeng
(74) *Attorney, Agent, or Firm* — Astute IP Law Group

(57) ABSTRACT

Example aspects include techniques for implementing real-time and low-latency synthesis of audio. These techniques may include generating a frame by sampling audio input in increments equal to a buffer size of until a threshold corresponding to a frame size used to train a machine learning (ML) model is reached, detecting feature information within the frame, determining, by the ML model, control information for audio reproduction based on the feature information. In addition, the techniques may include generating filtered noise information by inverting the noise magnitude control information using an overlap and add technique, generating, based on the control information, additive harmonic information by combining a plurality of scaled wavetables, and rendering audio output based on the filtered noise information and the additive harmonic information.

17 Claims, 14 Drawing Sheets

(51) Int. Cl.
*G10L 21/04* (2013.01)
*G10L 25/18* (2013.01)
*G10L 25/90* (2013.01)

(56) References Cited

U.S. PATENT DOCUMENTS

| | | | | |
|---|---|---|---|---|
| 2015/0142456 | A1* | 5/2015 | Lowe | G10L 19/00 704/503 |
| 2022/0013132 | A1 | 1/2022 | Engel et al. | |

OTHER PUBLICATIONS

International Search Report in PCT/SG2023/050315, mailed Oct. 24, 2023, 3 pages.
Shan et al., "Differentiable Wavetable Synthesis," ICASSP 2022, Feb. 13, 2022, 6 pages.

* cited by examiner

METHOD AND SYSTEM FOR REAL-TIME AND LOW LATENCY SYNTHESIS OF AUDIO USING NEURAL NETWORKS AND DIFFERENTIABLE DIGITAL SIGNAL PROCESSORS

BACKGROUND

In some instances, neural networks may be employed to synthesize audio of natural sounds, e.g., musical instruments, singing voices, and speech. Further, some audio synthesis implementations have begun to utilize neural networks that leverage different digital signal processors (DDSPs) to synthesize audio of natural sounds in an offline context via batch processing. However, real-time synthesis using a neural network and DDSP has not been realizable as the subcomponents employed when using a neural network and DDSP together have proven inoperable when used together in the real-time context. For example, the real-time buffer of the device and the frame size of the neural network may be different, which can significantly limit the utility and/or accuracy of the neural network. Further, the computations required to use a neural network and DDSP together are processor intensive and memory intensive, thereby restricting the type of devices capable of implementing a synthesis technique that uses a neural network and DDSP. Further, some of the computations performed when using a neural network with DDSP introduce a latency that makes real-time use infeasible.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a method may include generating a frame by sampling audio input in increments equal to a buffer size of a host device until a threshold corresponding to a frame size used to train a machine learning model is reached; extracting, from the frame, amplitude information, pitch information, and pitch status information; determining, by the machine learning model, control information for audio reproduction based on the amplitude information, the pitch information, and the pitch status information, the control information including pitch control information and noise magnitude control information; generating filtered noise information by inverting the noise magnitude control information using an overlap and add technique; generating, based on the pitch control information, additive harmonic information by combining a plurality of scaled wavetables; and rendering audio output based on the filtered noise information and the additive harmonic information.

In another aspect, a device may include an audio capture device; a speaker; a memory storing instructions, and at least one processor coupled with the memory and to execute the instructions to: capture audio input via the audio capture device; generate a frame by sampling the audio input in increments equal to a buffer size of a host device until a threshold corresponding to a frame size used to train a machine learning model is reached; extract, from the frame, amplitude information, pitch information, and pitch status information; determine, by the machine learning model, control information for audio reproduction based on the amplitude information, the pitch information, and the pitch status information, the control information including pitch control information and noise magnitude control information; filter the noise magnitude control information using an overlap and add technique to generate filtered noise information; generate, based on the pitch control information, additive harmonic information by combining a plurality of scaled wavetables; render audio output based on the filtered noise information and the additive harmonic information; and reproduce the audio output via the loudspeaker.

In another aspect, an example computer-readable medium (e.g., non-transitory computer-readable medium) storing instructions for performing the methods described herein and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

In order to synthesize realistic sounding audio of natural sounds, engineers have sought to employ neural audio synthesis with DDSPs. However, the current combination has proven to be infeasible for use in the real time context. For example, the subcomponents employed when using a neural network and DDSP together have proven inoperable when used together in the real-time context. As another example, the computations required to use a neural network and DDSP together are processor intensive and memory intensive, thereby restricting the type of devices capable of implementing a synthesis technique that uses a neural network and DDSP. As yet still another example, some of the computations performed when using a neural network with DDSP introduce a latency that makes real-time use infeasible.

This disclosure describes techniques for real-time and low latency synthesis of audio using neural networks and differentiable digital signal processors. Aspects of the present disclosure synthesize realistic sounding audio of natural sounds, e.g., musical instruments, singing voice, and speech. In particular, aspects of the present disclosure employ a machine learning model to extract control signals that are provided to a series of signal processors implementing additive synthesis, wavetable synthesis, and/or filtered noise synthesis. Further, aspects of the present disclosure employ novel techniques for subcomponent compatibility, latency compensation, and additive synthesis to improve audio synthesis accuracy, reduce the resources required to perform audio synthesis, and meet real-time context requirements. As a result, the present disclosure may be used to transform a musical performance using a first instrument into musical performance using another instrument or sound, provide more realistic sounding instrument synthesis, synthesize one or more notes of an instrument based on one or more samples of other notes of the instrument, and summarize the behavior and sound of a musical instrument.

Illustrative Environment

Figure 1:
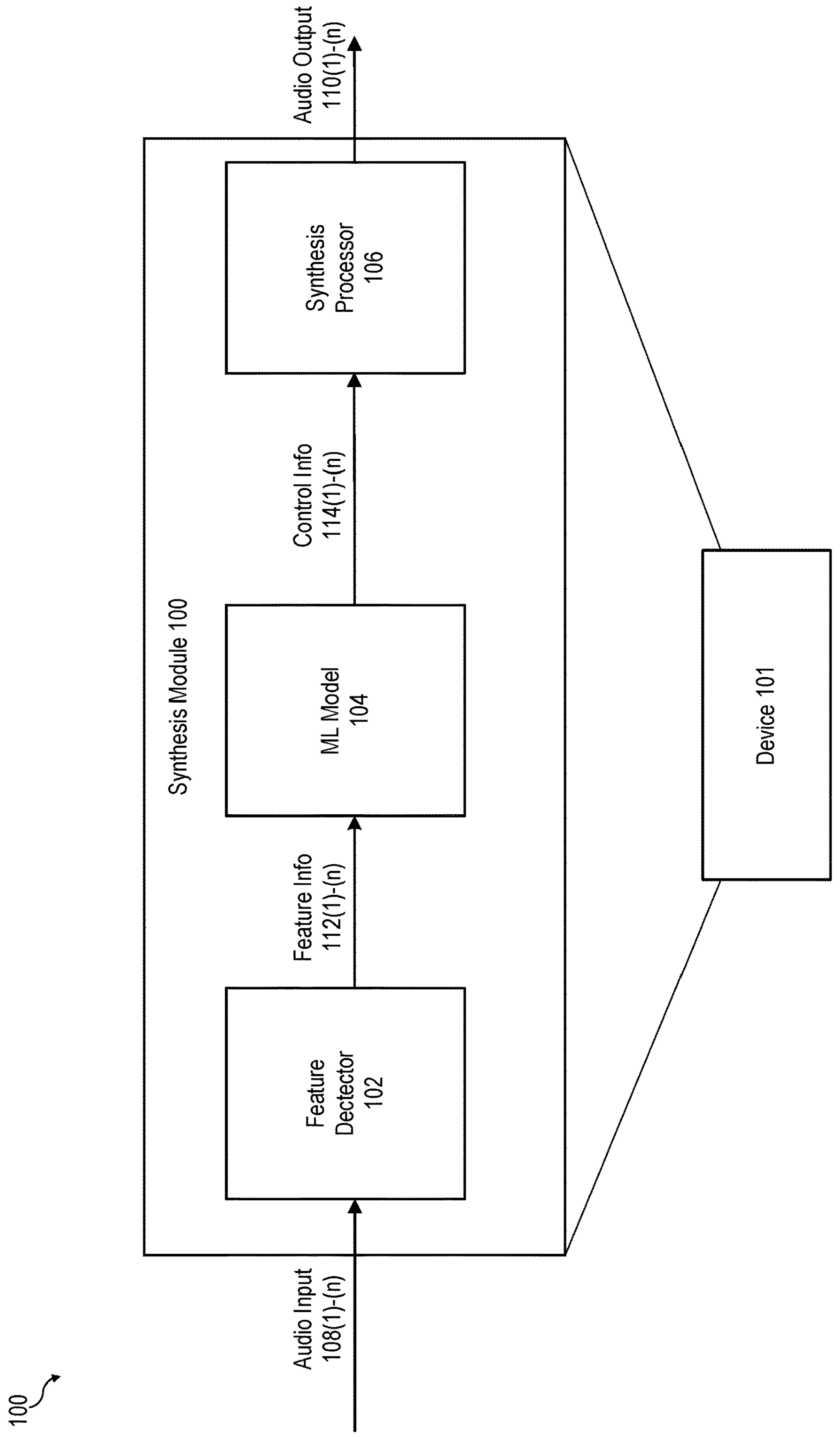
FIG. 1 illustrates an example architecture of a synthesis module, in accordance with some aspects of the present disclosure.

FIG. 1 illustrates an example architecture of a synthesis module 100, in accordance with some aspects of the present disclosure. The synthesis module 100 may be configured to synthesize high quality audio of natural sounds. In some examples, the synthesis module 100 may be employed by an application (e.g., a social media application) of a device 101 as a real-time audio effect that receives input and generates corresponding audio instantaneously, or by an application (e.g., a sound production application) of the device 101 as a real-time plug-in and/or an effect that receives music instrument digital interface (MIDI) input and generates corresponding audio instantaneously. Some examples of the device 101 include computing devices, smartphone devices, workstations, Internet of Things (IoT) devices, mobile devices, music instrument digital interface (MIDI) devices, wearable devices, etc. As illustrated in FIG. 1, the synthesis module 100 may include a feature detector 102, a machine learning (ML) model 104, and a synthesis processor 106. As used herein, in some aspects, "real-time" may refer to the immediate (or a perception of immediate or concurrent or instantaneous) response, for example, a response that is within milliseconds so that it is available virtually immediate when observed by a user. As used herein, in some aspects, "near real-time" may refer to within few milliseconds to a few seconds of concurrent.

As illustrated in FIG. 1, the synthesis module 100 may be configured to receive the audio input 108 and render audio output 110 in real-time or near real-time. In some examples, the synthesis module 100 may perform sound transformation by converting audio input 108 generated by a first instrument into audio output 110 of another instrument, accurate rendering by synthesizing audio output 110 with an improved quality, instrument cloning by synthesizing one or more notes of an instrument based on one or more samples of other notes of the instrument, and/or sample library compression by summarizing behavior and sound of a musical instrument. In some aspects, the audio input 108 may be one of multiple input modalities, e.g., the audio input may be a voice, an instrument, MIDI input, or continuous control (CC) input.

Figure 2:
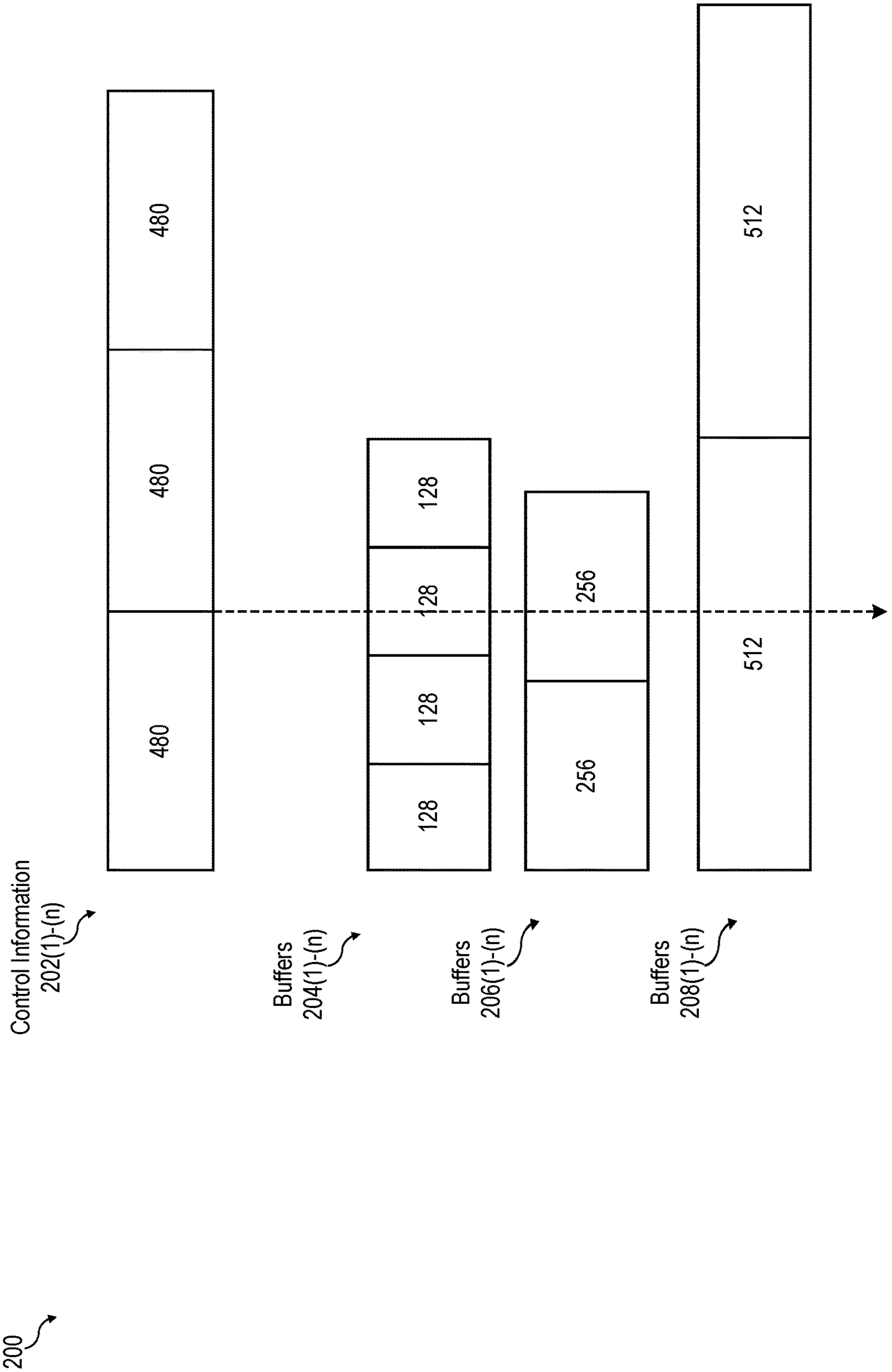
FIG. 2 illustrates an example method of frame generation, in accordance with some aspects of the present disclosure.

Further, in some aspects, the synthesis module 100 may be configured to generate a frame by sampling the audio input 108 in increments equal to a buffer size of the device 101 until a threshold corresponding to a frame size used to train the machine learning model 104 is reached, as described with respect to FIG. 2. Once the frame is generated, the frame may be provided downstream to the feature detector 102, and the synthesis module 100 may begin generating the next frame based on sampling the audio input 108 received after the threshold is reached. As such, the synthesis module 100 is configured to synthesize the audio output 110 even when the input/output (I/O) audio buffer does not match a buffer size used to train the ML model 104, as described with respect to FIG. 2. Accordingly, the present disclosure introduces intelligent handling of a mismatch between a system buffer size and a model training buffer size.

The feature detector 102 may be configured to detect feature information 112(1)-(*n*). In some aspects, the feature information 112 may include amplitude information, pitch information, and pitch status information of each frame generated by the synthesis module 100 from the audio input

108. Further, as illustrated in FIG. 1, the feature detector 102 may provide the feature information 112 of each frame to the ML model 104.

The ML model 104 may be configured to determine control information 114(1)-(*n*) based on the feature information 112(1)-(*n*) of the frames generated by the synthesis module 100. In some examples, the ML model 104 may include a neural network or another type of machine learning model. In some aspects, a "neural network" may refer to a mathematical structure taking an object as input and producing another object as output through a set of linear and non-linear operations called layers. Such structures may have parameters which may be tuned through a learning phase to produce a particular output, and are, for instance, used for audio synthesis. In addition, the ML model 104 may be a model capable of being used on a plurality of different devices having differing processing and memory capabilities. Some examples of neural networks can include feed-forward neural networks, recurrent neural networks (e.g., long short-term memory recurrent neural networks), convolutional neural networks or other forms of neural networks. For example, in some aspects, the ML model 104 may include a recurrent neural network with at least one recurrent layer. Further, the ML model 104 may be trained using various training or learning techniques, e.g., backwards propagation of errors. For instance, the ML model 104 may train to determine the control information 114. In some aspects, a loss function may be backpropagated through the ML model 104 to update one or more parameters of the ML model 104 (e.g., based on a gradient of the loss function). Various loss functions can be used such as mean squared error, likelihood loss, cross entropy loss, hinge loss, etc. In some aspects, the loss comprises a spectral loss determined between two waveforms. Further, gradient descent techniques may be used to iteratively update the parameters over a number of training iterations.

As illustrated in FIG. 1, the ML model 104 may receive the feature information 112(1)-(*n*) from the feature detector 102, and generate corresponding control information 114 (1)-(*n*) including control parameters for one or more DDSPs (e.g., an additive synthesizer and a filtered noise synthesizer) of the synthesis processor 106, which are trained to generate the audio output 110 based on the control parameters. As used herein, a "DDSP" may refer to technique that utilizes strong inductive biases from DSP combined with modern ML. Some examples of the control parameters include pitch control information and noise magnitude control information. Further, in some aspects, the ML model 104 may provide independent control over pitch and loudness during synthesis via the different control parameters of the control information 114(1)-(*n*).

Additionally, in some aspects, the ML model 104 may be configured to process the control information 114 based on pitch status information before providing the control information 114 to the synthesis processor 106. For instance, rendering the audio output 110 based on a frame lacking pitch may cause chirping artifacts. Accordingly, to reduce chirping artifacts within the audio output 110, the ML model 104 may zero the harmonic distribution of the control information 114 based on the pitch status information indicating that the current frame does not have a pitch, as described in detail with respect to FIGS. 5A-8B.

Additionally, the synthesis processor 106 may be configured to render the audio output 110 based on the control information 114(1)-(*n*). For example, the synthesis processor 106 may be configured to generate a noise audio component using an overlap and add technique, generate a harmonic audio component from plurality of scaled wavetables using the pitch control information, and render the audio output 110 based on the noise audio component and harmonic audio component. Further, as described with respect to FIGS. 10-11, the synthesis processor 106 may efficiently synthesize the harmonic audio components of the audio output 110 by dynamically generating a wavetable for each frame and linearly cross-fading the wavetable with wavetables of adjacent frames instead of performing more processor intensive techniques based on summing sinusoids. As an example, a user may sing into a microphone of the device 101, the device 101 may capture the singing voice as the audio input 108, and the synthesis module 100 generate individual frames as the audio input 108 is captured in real-time. Further, the feature detector 102, the ML model 104, and synthesis processor 106 may process the frames in real-time as they are generated to synthesize the audio output 110, which may be violin notes perceived as playing a tune sung by the singing voice.

FIG. 2 illustrates an example method of frame generation, in accordance with some aspects of the present disclosure. As illustrated in diagram 200, an ML model (e.g., the ML model 104) may be configured to output control information 202(1)-(*n*) (e.g., the control information 114) every 480 samples (i.e., the frame size). In a first example, the I/O buffer size of a device implementing the synthesis process may be 128 samples. During frame generation, a synthesis module (e.g., the synthesis module 100) may generate a frame including the data from the 1st sample of the first buffer 204(1) to the 36th sample of the fourth buffer 204(4), and trigger performance of the synthesis method of the synthesis module on the frame to generate a portion of the audio output (e.g., the audio output 110). In a second example, the I/O buffer size of a device implementing the synthesis process may be 256 samples. During frame generation, a synthesis module (e.g., the synthesis module 100) may generate a frame including the data from the 1st sample of the first buffer 206(1) to the 224th sample of the second buffer 206(2), and trigger performance of the synthesis method of the synthesis module on the frame to generate a portion of the audio output (e.g., the audio output 110). In a third example, the I/O buffer size of a device implementing the synthesis process may be 512 samples. During frame generation, a synthesis module (e.g., the synthesis module 100) may generate a frame including the data from the 1st sample of the first buffer 208(1) to the 480th sample of the first buffer 208(2), and trigger performance of the synthesis method of the synthesis module on the frame to generate a portion of the audio output (e.g., the audio output 110). As such, the synthesis module implements intelligent handling of a mismatch between a system buffer size and a model training buffer size, thereby permitting usage of the synthesis module in an application that allows real-time or near real-time modification to the I/O buffer size.

Figure 3:
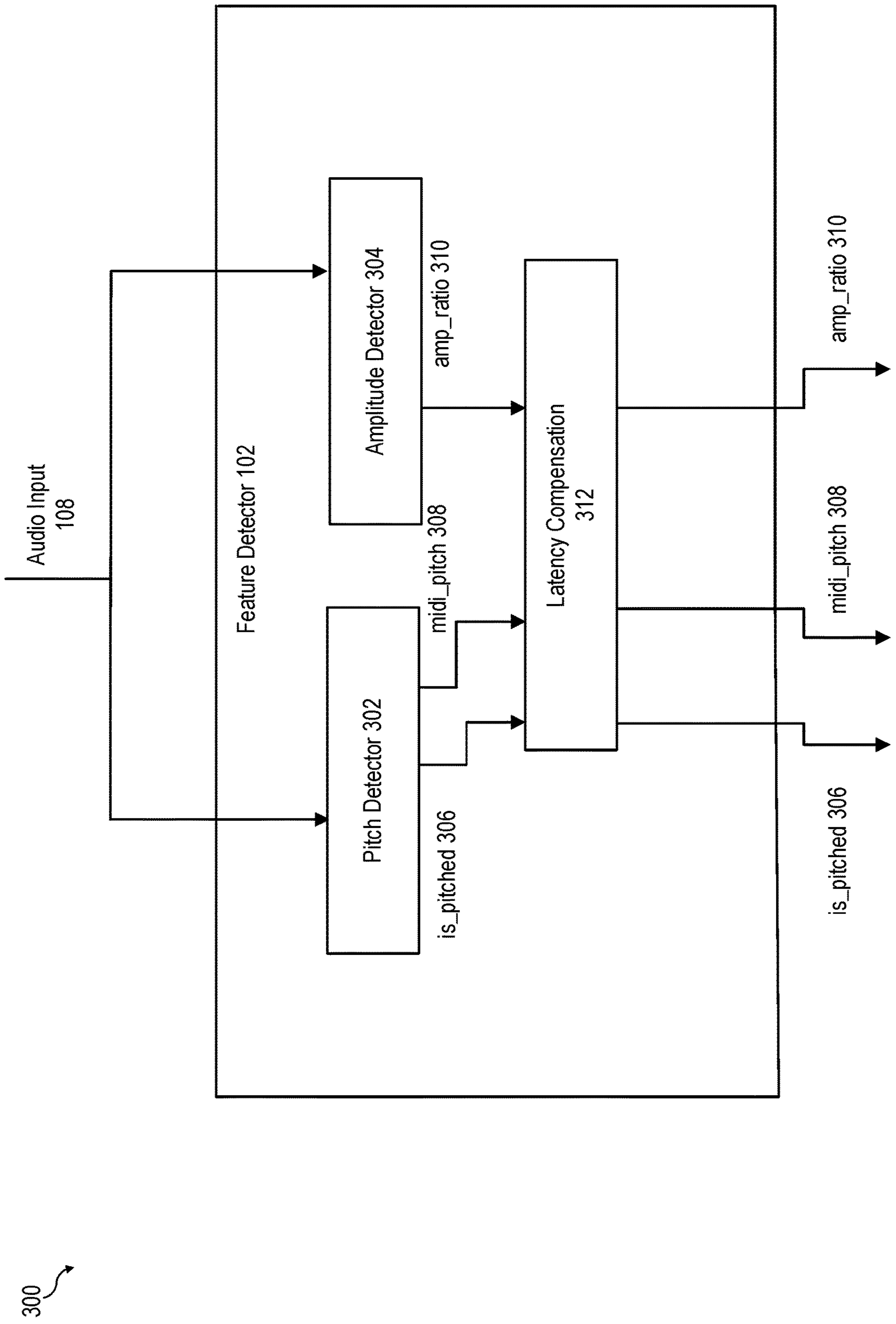
FIG. 3 illustrates an example architecture of a synthesis module, in accordance with some aspects of the present disclosure.

FIG. 3 illustrates an example architecture 300 of a feature detector 102, in accordance with some aspects of the present disclosure. As illustrated in FIG. 3, the feature detector 102 may include a pitch detector 302 and an amplitude detector 304. Further, the feature detector 102 may be configured to detect the feature information 112(1)-(*n*). In some aspects, the pitch detector 302 may be configured to determine pitch status information 306 (is_pitched) and pitch information 308 (midi_pitch). For example, the pitch detector 302 may be configured to employ a sparse Viterbi algorithm to determine the pitch status information 306 and the pitch information 308. The pitch status information 306 may indicate whether the audio input 108 is pitched, and the pitch information 308 may indicate one or more attributes of the pitch of the audio input 108. The amplitude detector 304 may be configured to determine amplitude information 310 (amp_ratio). For example, in some aspects, the amplitude detector 304 may be configured to employ a one-pole lowpass filter to determine the amplitude information 310.

Further, as illustrated in FIG. 3, the feature information 112 may be latency compensated. For example, the feature detector 102 may include a latency compensation module 312 configured to receive the pitch status information 306, the pitch information 308, and the amplitude information 310, align the pitch status information 306, the pitch information 308, and the amplitude information 310, and output the pitch status information 306, the pitch information 308, and the amplitude information 310 to the next subsystem within the synthesis module 100, e.g., the ML model 104. Further, in some aspects, the latency compensation module 312 supports real-time processing by compensating for the latency caused by the feature detector 102, such compensation would not be required in a non-real-time context where batch processing is performed.

Figure 4:
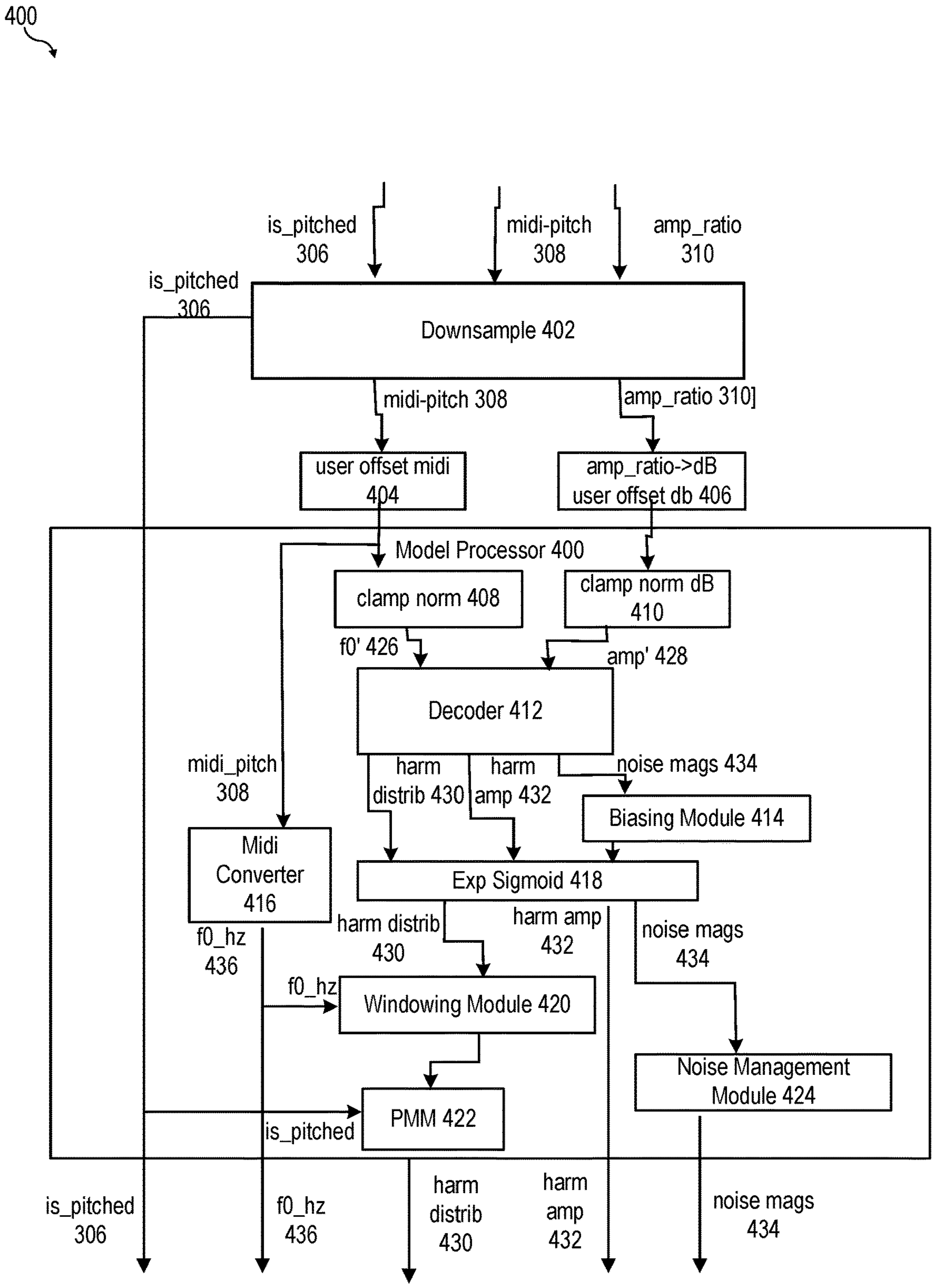
FIG. 4 illustrates an example architecture of a HFAB, in accordance with some aspects of the present disclosure.

FIG. 4 illustrates an example architecture 400 of a ML model 104, in accordance with some aspects of the present disclosure. As illustrated in FIG. 4, the feature information (e.g., the pitch status information 306, the pitch information 308, and the amplitude information 310) may be provided to a downsampler 402 configured to downsample the feature information before the feature information is provided to the ML model 104. In some aspects, the feature information maybe downsampled to align with a specified interval of the ML model 104 for predicting the control information. As an example, if the sample rate of the device 101 is equal to 48000 Hz and ML model is trained with 250 frames per second, the downsampler 402 may provide every 192nd sample to the next subsystem as 48,000 divided 250 equals 192. As such, the present disclosure describes configuring a synthesis module (e.g., the synthesis module 100) to account for mismatches between the system sample rate and the model training sample rate.

As illustrated in FIG. 4, the downsampler 402 may provide the downsampled feature information (e.g., the pitch information 308 and the amplitude information 310) to a user offset midi 404 and a user offset db 406, respectively, that provide user input capabilities. In addition, the user offset midi 404 and user offset db 406 can be modulated by other control signals to provide more creative and artistic effects.

Further, as illustrated in FIG. 4, the ML model 104 may include a first clamp and normalizer 408, a second clamp and normalizer 410, a decoder 412, a biasing module 414, a midi converter 416, an exponential sigmoid module 418, a windowing module 420, a pitch management module 422, and noise management module 424. In addition, first clamp and normalizer 408 may be configured to receive the pitch information 308, generate the fundamental frequency 426, and provide the fundamental frequency 426 to the decoder 412. In some aspects, the clamping may be between the range of 0 and 127, and the normalization may between the range 0 to 1. Further, the second clamp and normalizer 410 may be configured to receive the amplitude information 310, generate the amplitude 428, and provide the amplitude 428 to the decoder 412. In some aspects, the clamping may be between the range of −120 and 0, and the normalization may between the range 0 to 1.

Additionally, the decoder 412 may be configured to generate control information (e.g., the harmonic distribution 430, harmonic amplitude 432, and noise magnitude information 434) based on the fundamental frequency 426 and the amplitude 428. In some aspects, the decoder 412 maps the fundamental frequency 426 and the amplitude 428 to control parameters for the synthesizers of the synthesis processor 106. In particular, the decoder 412 may comprise a neural network which receives the fundamental frequency 426 and the amplitude 428 as inputs, and generates control inputs (e.g., the harmonic distribution 430, the amplitude 432, and the noise magnitude information 434) for the DDSP element(s) of the synthesis processor 106.

Further, the exponential sigmoid module 418 may be configured to format the control information (e.g., harmonic distribution 430, harmonic amplitude 432, and noise magnitude information 434 via the biasing module 414) as non-negative by applying a sigmoid nonlinearity. As illustrated in FIG. 4, the exponential sigmoid module 418 may further provide the control information to the windowing module 420. In some aspects, the midi converter 416 may receive the pitch information 308 from the user offset midi 404, determine the fundamental frequency in Hz 436, and provide the fundamental frequency in Hz 436 to the decoder 412 and the windowing module 420.

The windowing module 420 may be configured to receive the harmonic distribution 430 and the fundamental frequency in Hz 436, and upsample the harmonic distribution 430 with overlapping Hamming window envelopes with predefined values (e.g., frame size of 128 and hop size of 64) based on the fundamental frequency in Hz 436. As described in detail with respect to FIGS. 5A-5B, the pitch management module 422 may modify (e.g., zero) the harmonic distribution 430 before the harmonic distribution 430 is provided to the synthesis processor 106 if the current frame does not have a pitch. Further, the noise management module 424 may modify (e.g., zero) the noise magnitude information 434 before the noise magnitude information 434 is provided to the synthesis processor 106 if the noise magnitude information 434 is above the playback Nyquist and 20,000 Hz.

Further, in some aspects, the device 101 may display visual data corresponding to the control information. For example, in some aspects, the device 101 may include a graphical user interface that displays the pitch status information 306, the harmonic distribution 430, harmonic amplitude 432, and noise magnitude information 434, and/or fundamental frequency in Hz 436. Further, the control information 114 may be presented in a thread safe manner that does not negatively impact the synthesis module determining the audio output and/or add audio artifacts. For example, in some aspects, double buffering of the harmonic distribution may be employed to allow for the harmonic distribution to be safely displayed in a GUI thread.

Figure 5A:
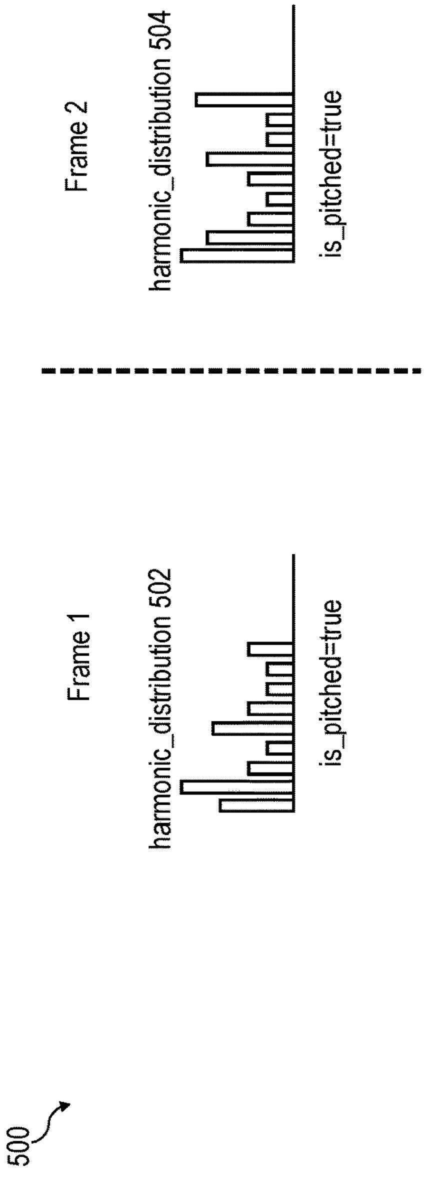
FIG. 5A is a diagram illustrating generation of control information, in accordance with some aspects of the present disclosure.
Figure 5B:
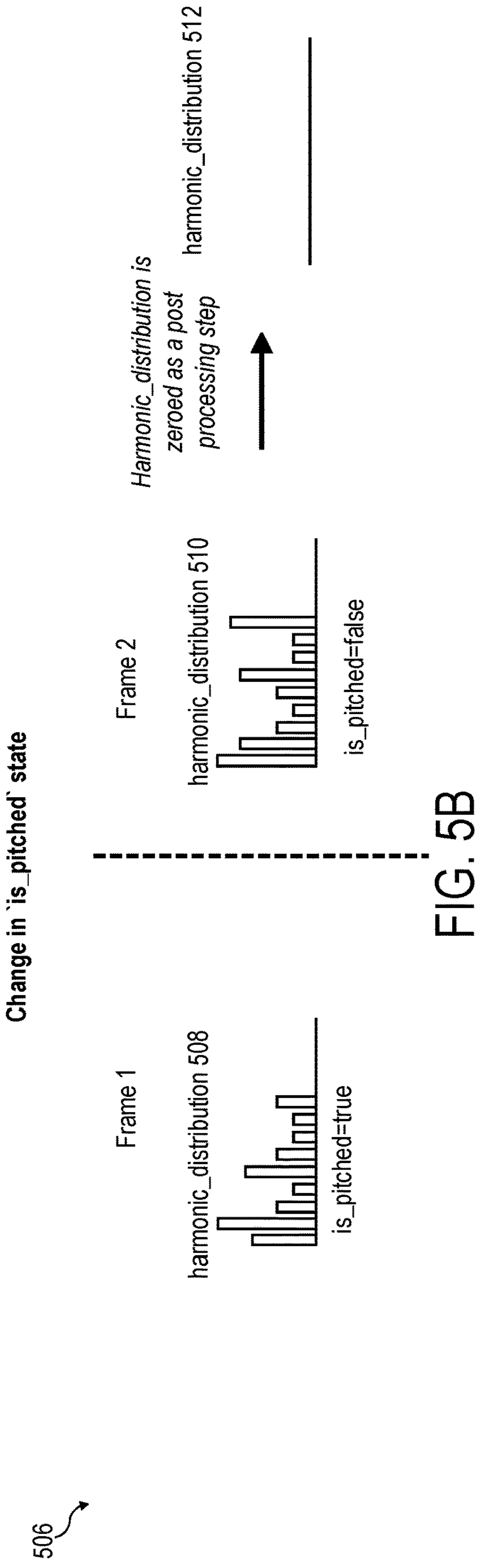
FIG. 5B is a diagram illustrating generation of control information based on pitch status information, in accordance with some aspects of the present disclosure.

FIGS. 5A-5B are diagrams illustrating examples of generating control information based on pitch status information, in accordance with some aspects of the present disclosure. As illustrated by diagram 500 of FIG. 5A, when the pitch status information (e.g., pitch status information 306) indicates that the frames 1 and 2 are pitched, the harmonic distribution 502-504 corresponding to the frames, respectively, are not zeroed by the pitch management module (e.g., pitch management module 422). As illustrated by diagram 506 of FIG. 5B, when the pitch status information (e.g., pitch status information 306) indicates that frame 1 is pitched, the harmonic distribution 508 of the frame 1 is not zeroed by the pitch management module (e.g., pitch management module 422). Further, when the pitch status information indicates that frame 2 is not pitched, the harmonic distribution 510 corresponding to frame 2 may be zeroed by the pitch management module to generate a zeroed harmonic distribution 512 in order to reduce the number of chirping artifacts within the sound output (e.g., the audio output 110).

Figures 6A, 6B, 6C:
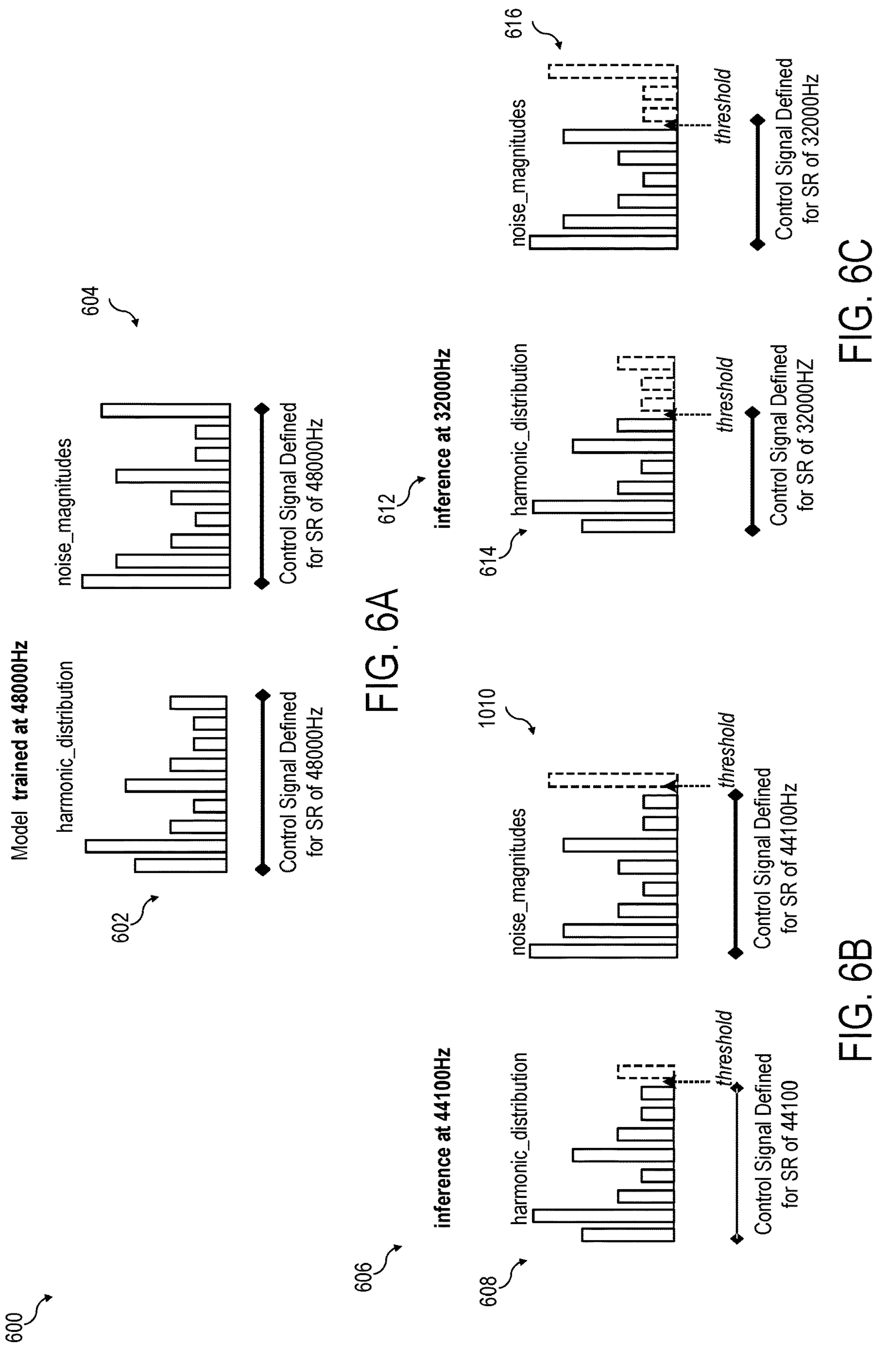
FIG. 6A is a diagram illustrating first example control information, in accordance with some aspects of the present disclosure.
FIG. 6B is a diagram illustrating second example control information, in accordance with some aspects of the present disclosure.
FIG. 6C is a diagram illustrating third example control information, in accordance with some aspects of the present disclosure.

FIGS. 6A-6C are diagrams illustrating example control information, in accordance with some aspects of the present disclosure. For example, with respect to the diagram 600, a ML model (e.g., the ML model) may have been trained at 48,000 Hz. As such, the sample rate for the harmonic distribution 602 and the noise magnitude 604 may have been defined at 48,000 hz, as illustrated in diagram 600. Further, the present disclosure describes calculating a threshold index where control signals above the Nyquist frequency should be removed. This is done on a per-frame level based on the target inference sample rate. For example, with respect to the diagram 606, the pitch management module (e.g., the pitch management module 422) may identify a threshold index (e.g., 44100 kHz) corresponding to the sample rate that has been configured at the device (e.g., device 101). Further, the harmonic distribution 608 and the noise magnitudes 610 may be trimmed to the threshold index, and transmitted to the synthesis processor (e.g., the synthesis processor 106) as the control information (e.g., the control information 114). As another example, with respect to the diagram 612, the pitch management module (e.g., the pitch management module 422) may identify a threshold index (e.g., 32,000 Hz) corresponding to the sample rate that has been configured at the device (e.g., device 101). Further, the harmonic distribution 608 and the noise magnitudes 610 may be trimmed to the threshold, and transmitted to the synthesis processor (e.g., the synthesis processor 106) as the control information (e.g., the control information 114). In some aspects, trimming the control information may reduce the number of computations performed downstream by the synthesis processor (e.g., the synthesis processor 106), thereby improving real-time performance by reducing the amount of processor and memory resources required to generate sound output (e.g., the audio output 110) based on the control information.

Figure 7:
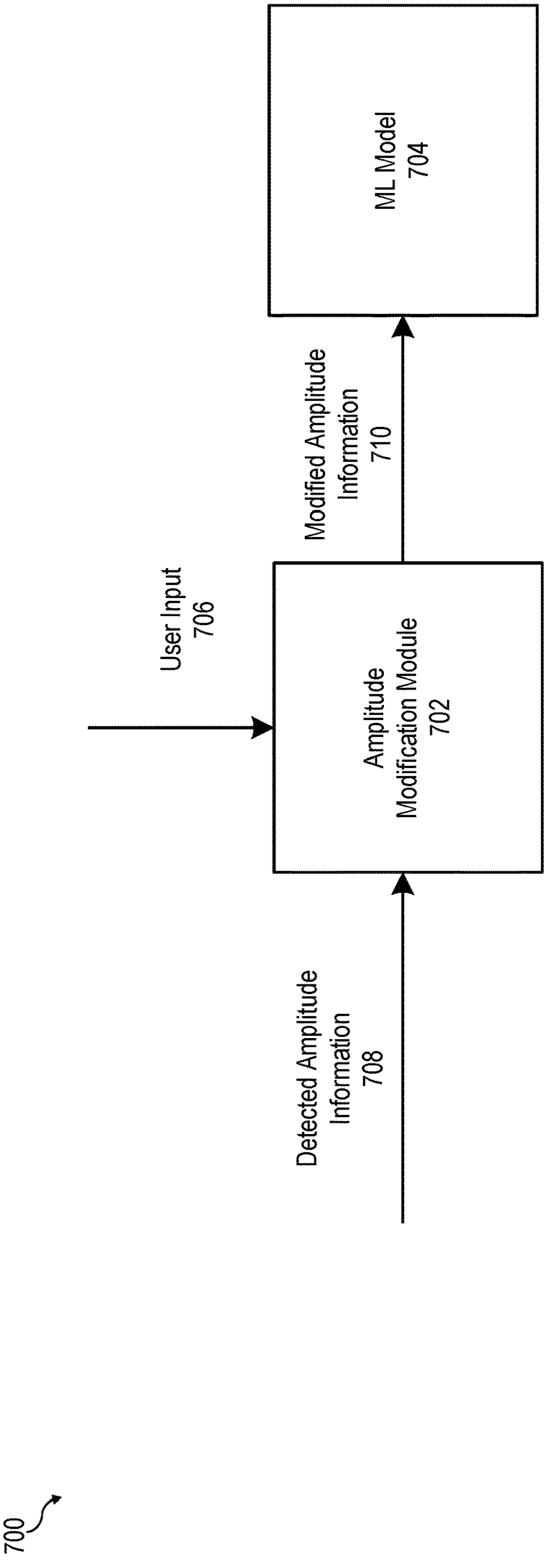
FIG. 7 illustrates an example method of amplitude modification, in accordance with some aspects of the present disclosure.

FIG. 7 illustrates an example method of amplitude modification, in accordance with some aspects of the present disclosure. In some examples, a synthesis module (e.g., synthesis module 100) may employ an amplification modification control module 702 to improve the quality of the audio output (e.g., the audio output 110). For instance, if the amplitude information 708 (e.g., amplitude information 310) detected by the feature detector (e.g., the feature detector 102) does not have a dynamic range calibrated for a related ML model 704 (e.g., the ML model 104), the amplitude information may cause the related synthesis processor (e.g., the synthesis processor 106) to generate sub-par audio quality. Accordingly, the amplification modification control module 702 may be configured to receive user input 706 and apply an amplitude transfer curve based on user input 706. Further, the amplitude transfer curve may modify the detected amplitude information 708 (e.g., the amplitude information 310) to generate the modified amplitude information 710.

In some examples, the user input 706 may include a linear control that allows the user to compress or expand the amplitude about a target threshold. Further, a ratio may define how strongly the amplitude is compressed towards (or expanded away from) the threshold. For example, ratios greater than 1:1 (e.g., 2:1) pull the signal towards the threshold, ratios lower than 1:1 (e.g., 0.5:1) push the signal away from the threshold, and a ratio of exactly 1:1 has no effect, regardless of the threshold.

In some examples, the user input 706 may be employed as parameters for transient shaping of the amplitude control signal. Further, the user input 706 for transient shaping may include an attack input which controls the strength of transient attacks. Positive percentages for the attack input may increase the loudness of transients, negative percentages for the attack input may reduce the loudness of transients, and a level of 0% may have no effect. The user input 706 for transient shaping may also include a sustain input that controls the strength of the signal between transients. Positive percentages for the sustain input may increase the perceived sustain, negative percentages for the sustain input may reduce the perceived sustain, and a level of 0% may have no effect. In addition, the user input 706 for transient shaping may also include a time input representing a time characteristic. Shorter times may result in sharper attacks while longer times may result in longer attacks.

In some examples, the user input may further include a knee input defining the interaction between a threshold and a ratio during transient shaping of the amplitude control signal. In some aspects, the threshold may represent an expected amplitude transfer curve threshold, while the ratio may represent an expected amplitude transfer curve ratio. In addition, the user input may include an amplitude transfer curve knee width.

Figure 8:
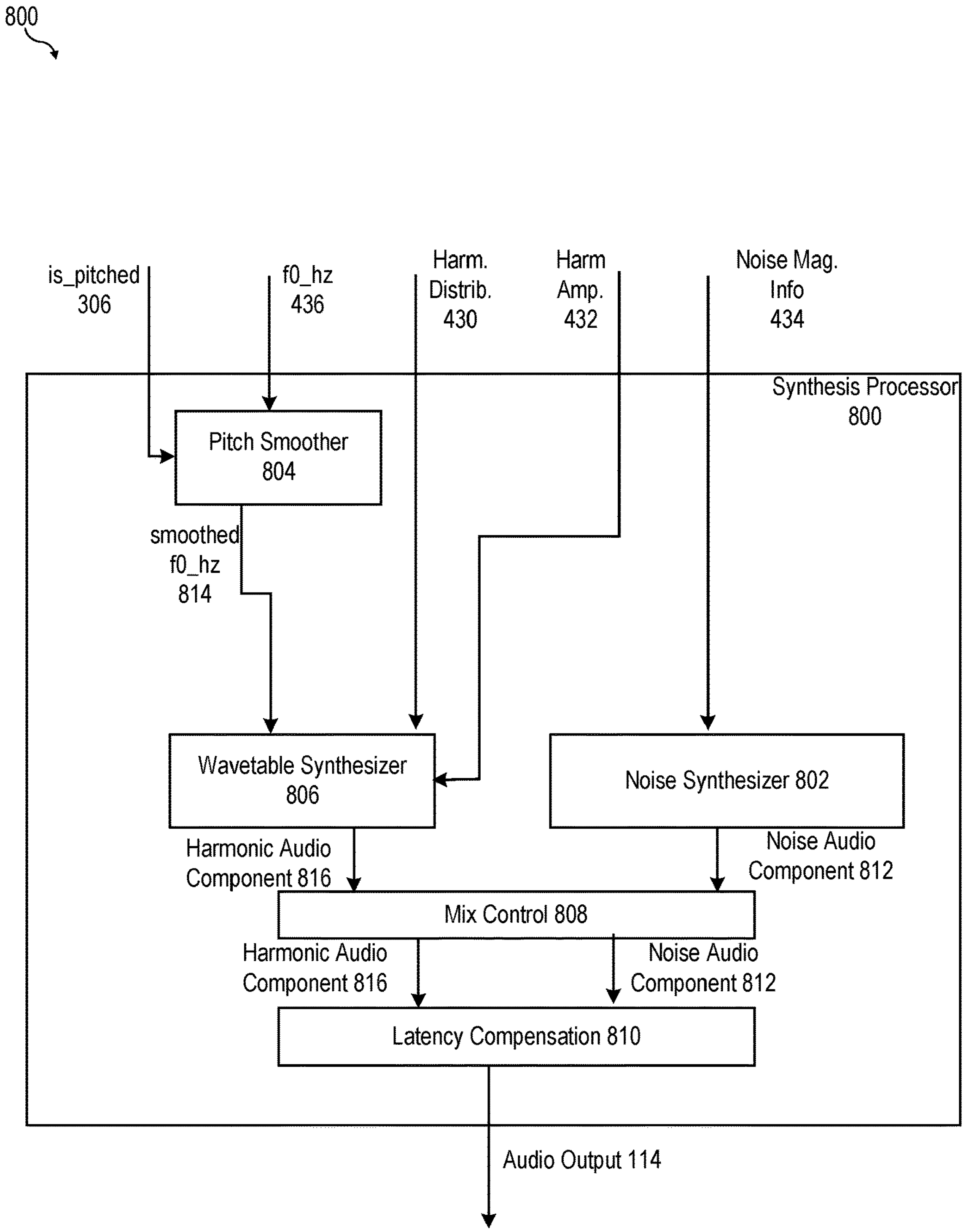
FIG. 8 is a diagram illustrating an example architecture of a synthesis processor, in accordance with some aspects of the present disclosure.

FIG. 8 illustrates an example architecture 800 of a synthesis processor 106, in accordance with some aspects of the present disclosure. The synthesis processor 106 may be configured to synthesize the audio output (e.g., audio output 110) based on the control information (e.g., control information 114) received from a ML model (e.g., the ML model 104). For instance, in some aspects, the synthesis processor 106 may be configured to generate the audio output based on the parameters of the control information 114, and minimize a reconstruction loss between the audio output (i.e., the synthesized audio) and the audio input (e.g., audio input 108). As described herein, the control information may include the pitch status information 306, the fundamental frequency in Hz 436, the harmonic distribution 430, the harmonic amplitude 432, and noise magnitude information 434.

Further, as illustrated in FIG. 8, the synthesis processor 106 may include a noise synthesizer 802, a pitch smoother 804, wavetable synthesizer 806, mix control 808, and latency compensation module 810. The noise synthesizer 802 may be configured to provide a stream of filtered noise in accordance with a harmonic plus noise model. Further, in some aspects, the noise synthesizer 802 may be a differentiable filter noise synthesizer that incorporates a linear-time-varying finite-impulse-response (LTV-FIR) filter to a stream of uniform noise based on the noise magnitude information 434. For example, as illustrated in FIG. 8, the noise synthesizer 802 may receive the noise magnitude information 434 and generate the noise audio component 812 of the audio output based on the noise magnitude information 434. In addition, as described with respect to FIG. 9, the noise synthesizer 802 may employ an overlap and add technique to generate the noise audio component 812 at a size equal to the buffer size of device (e.g., the device 101). In some aspects, the noise synthesizer 802 may perform the overlap and add technique via a circular buffer to provide real-time overlap and add performance. As described herein, an "overlap and add method" may refer to the recomposition of a longer signal by successive additions of smaller component signals. In some aspects, the size of the noise audio component 812 may not be equal to the frame size used to train the corresponding ML model and/or the buffer size used by the device. Instead, the size of noise audio component 812 may be equal to the fixed fast Fourier transformation (FFT)

length that depends on the number of noise magnitude information 434. Further, the fixed FFT length may be larger than the real-time buffer size. Accordingly, the noise synthesizer 802 may be configured to write, via an overlap and add technique, the noise audio component 812 to a circular buffer and read, in accordance with real-time buffer size, the noise audio component 812 from the circular buffer.

As illustrated in FIG. 8, the pitch smoother 804 may be configured to receive the pitch status information 306 and the fundamental frequency in Hz 436, and generate a smooth foundation frequency in Hz 814. Further, the pitch smoother 804 may provide the smooth fundamental frequency in Hz 814 to the wavetable synthesizer 806. Upon receipt of the smooth foundation frequency in Hz 436, harmonic distribution 430, and harmonic amplification 432, the wavetable synthesizer 806 may be configured to convert, via a fast Fourier transformation (FFT), the harmonic distribution 430 into a first dynamic wavetable, scale the first wavetable to generate a first scaled wavetable based on multiplying first wavetable by the harmonic amplitude 432, and linearly crossfade the first scaled wavetable with a second scaled wavetable associated with the frame preceding the current frame and a third scaled wavetable associated with the frame succeeding the current frame to generate the harmonic audio component 816. As used herein, a wavetable may refer to a time domain representation of a harmonic distribution of a frame. Wavetables are typically 256-4096 samples in length, and a collection of wavetables can contain a few to several hundred wavetables depending on the use case. Further, periodic waveforms are synthesized by indexing into the wavetables as a lookup table and interpolating between neighboring samples. In some aspects, the wavetable synthesizer 806 may employ the smooth fundamental frequency in Hz 814 to determine where in the wavetable to read from using a phase accumulating fractional index.

Wavetable synthesis is well-suited to real-time synthesis of periodic and quasi-periodic signals. In many instances, real-world objects that generate sound often exhibit physics that are well described by harmonic oscillations (e.g., vibrating strings, membranes, hollow pipes and human vocal chords). By using lookup tables composed of single-period waveforms, wavetable synthesis can be as general as additive synthesis whilst requiring less real-time computation. Accordingly, the wavetable synthesizer 806 provides speed and processing benefits over traditional methods that require additive synthesis over numerous sinusoids, which cannot be performed in real-time. Further, in some aspects, the wavetable synthesizer 806 may employ a double buffer to store and index the scaled wavetables generated from the audio input 108, thereby providing storage benefits in addition to the computational benefits.

In some aspects, the wavetable synthesizer 806 may be further configured to apply frequency-dependent antialiasing to a wavetable. For example, the synthesis processor 106 may be configured to apply frequency-dependent antialiasing to the wavetable based on the pitch of the current frame as represented by the smooth fundamental frequency in Hz 814. Further, the frequency-dependent antialiasing may be applied to the scaled wavetable prior to storing the scaled wavetable within the double buffer.

Further, the mix control 808 be configured be independently increase or decrease the volumes of the noise audio component 812 and the harmonic audio component 816, respectively. In some aspects, the mix control 808 may modify the volume of the noise audio component 812 and/or the harmonic audio component 816 in a real-time safe manner based on user input. In addition, the mix control 808 may be configured to apply a smoothing gain when modifying the noise audio component 812 and/or the harmonic audio component 816 to prevent audio artifacts. Further, the mix control 808 may be implemented using a real-time safe technique in order to reduce and/or limit audio artifacts.

Additionally, the mix control 808 may provide the noise audio component 812 and the harmonic audio component 816 to the latency compensation module 810 to be aligned. For example, the noise synthesizer 802 may introduce delay that may be corrected by the latency compensation module. In particular, in some aspects, the latency compensation module 810 may shift the noise audio component 812 and/or the harmonic audio component 816 so that the noise audio component 812 and/or the harmonic audio component 816 are properly aligned, and combine the noise audio component 812 and the harmonic audio component 816 to form the audio output 110. As described herein, in some examples, the latency compensation module 810 may combine the noise audio component 812 and the harmonic audio component 816 to form an audio output 110 associated with an instrument differing from the instrument that produced the audio input 108. In some other examples, the latency compensation module 810 may combine the noise audio component 812 and the harmonic audio component 816 to form an audio output 110 of one or more notes of an instrument based on one or more samples of other notes of the instrument captured within the audio input 108.

Figure 9:
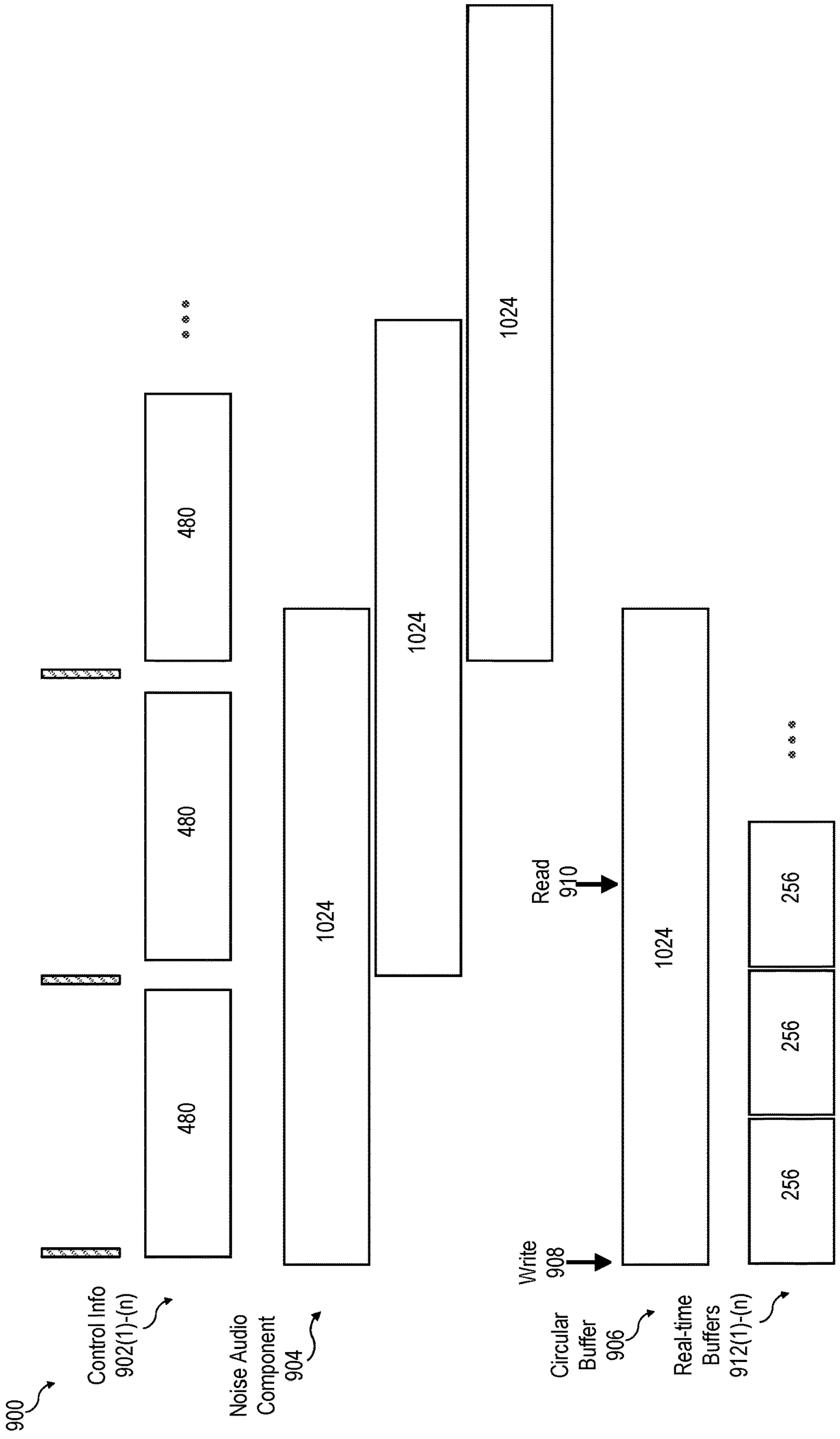
FIG. 9 illustrates an example technique performed by a noise synthesizer, in accordance with some aspects of the present disclosure.

FIG. 9 illustrates an example technique performed by a noise synthesizer, in accordance with some aspects of the present disclosure. As illustrated in diagram 900, a noise synthesizer (e.g., the noise synthesizer 802) may periodically receive a plurality of control information 902(1)-(*n*) from a ML model (e.g., the ML model 104) in accordance with a predefined period corresponding to the frame size used to train the ML model. For example, the noise synthesizer may receive control information 902 for an individual frame every 480 samples. Further, in some instances, the noise synthesizer may not render the noise audio component 904(1)-(*n*) in a block size equal to the frame size or the buffer size. Instead, each noise audio component (e.g., noise audio component 812) may be fixed to a size of the FFT window. Additionally, in some examples, in order to conserve memory and provide quick access to the noise audio component 904(1)-(*n*), the noise synthesizer may store the noise audio component 904 in a circular buffer 906. As illustrated in FIG. 9, the noise synthesizer may overwrite previously-used data in the circular buffer 906 by performing a write operation 908 to the circular buffer 906, and access the noise audio component 904(1)-(*n*) by performing a read operation 910 from the circular buffer 906. In some examples, the read operation may read enough data (i.e., samples) from the circular buffer 906 to fill the real-time buffers 912(1)-(*n*). Further, as described with respect to FIG. 8, the data read from the circular buffer 906 may be provided to a latency compensation module (e.g., latency compensation module 810) via the mix control (e.g., the mix control 808), to be combined with a harmonic audio component (e.g., harmonic audio component 816) generated based on the audio input 108.

Figure 10:
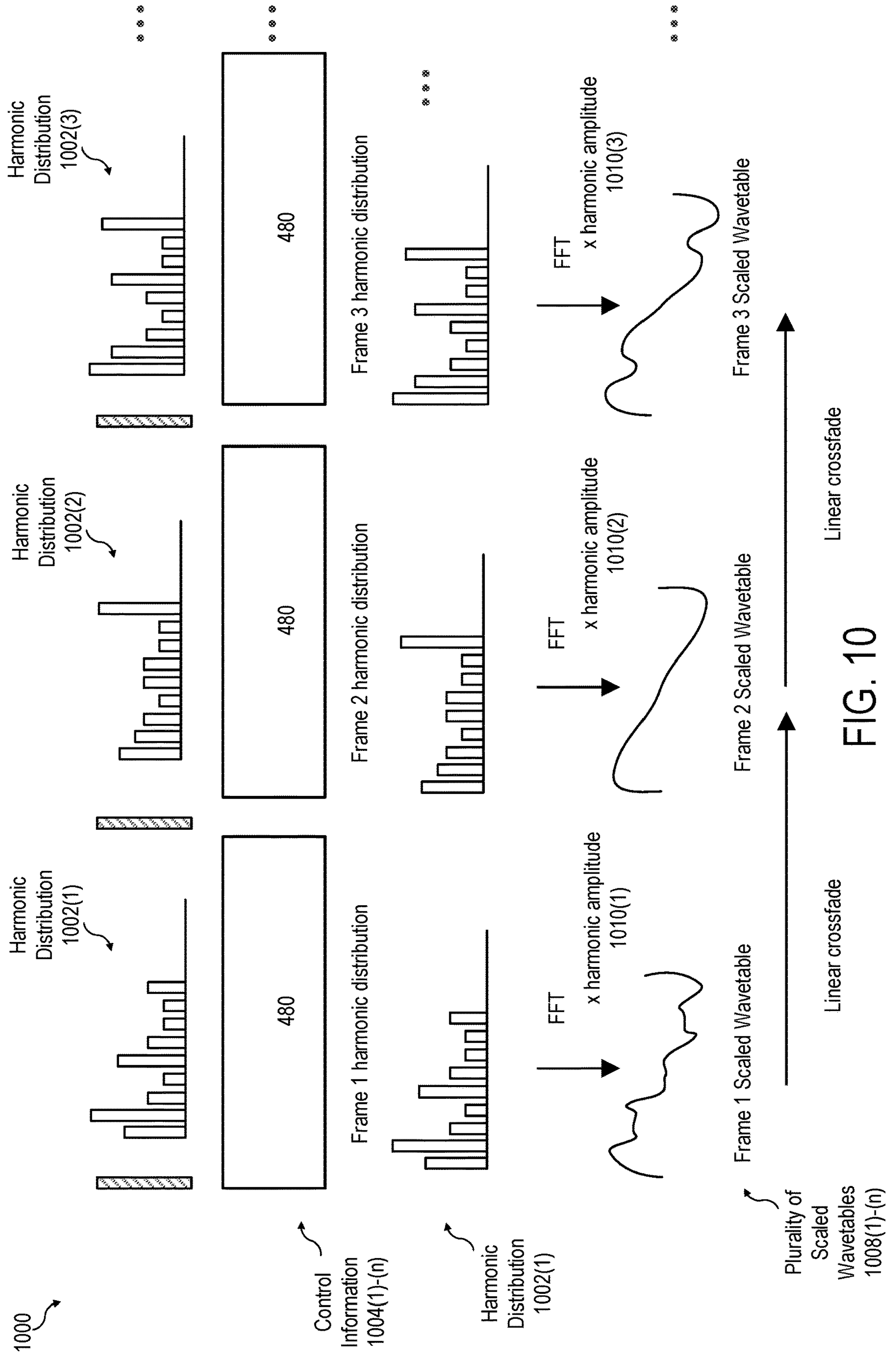
FIG. 10 illustrates an example technique performed by a wavetable synthesizer, in accordance with some aspects of the present disclosure.

FIG. 10 illustrates an example technique performed by a wavetable synthesizer, in accordance with some aspects of the present disclosure. As illustrated in diagram 1000, a wavetable synthesizer (e.g., wavetable synthesizer 806) may periodically receive harmonic distribution 1002 within each frame of control information 1004 received from the ML model (e.g., the ML model 104). For example, the control information for a first frame 1004(1) may include a first harmonic distribution 1002(1), the control information for a nth frame 1004(*n*) may include a nth harmonic distribution 1002(*n*), and so forth. As illustrated in FIG. 10, a wavetable synthesizer may be configured to generate a plurality of scaled wavetables 1008 based on the harmonic distribution 1002 and harmonic amplitude of 1010 of the control information 1004. Further, the noise synthesize may generate the harmonic component by linearly crossfading the plurality of scaled wavetables 1008. In some aspects, the crossfading is performed broadly via interpolation.

Figure 11:
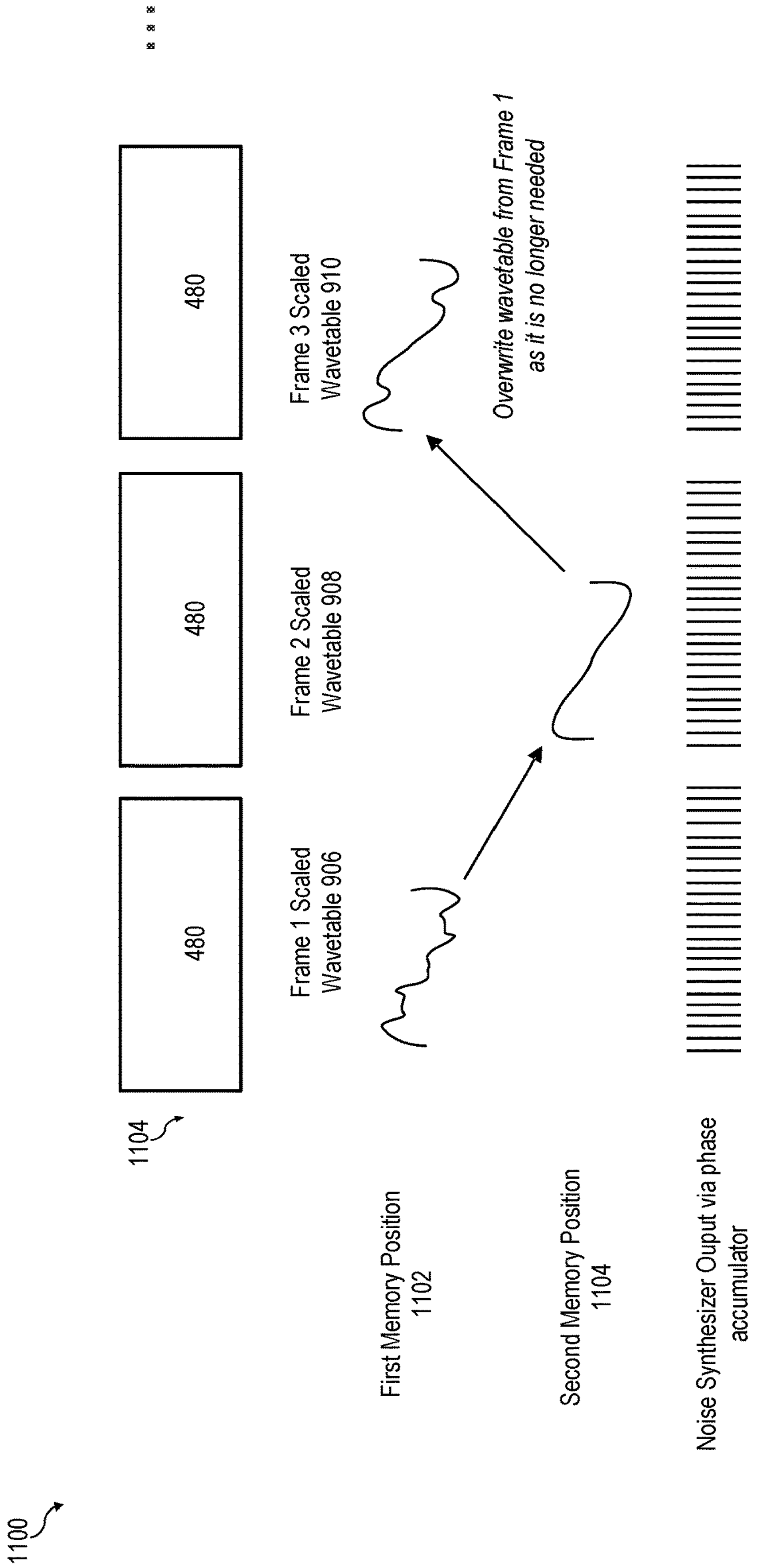
FIG. 11 illustrates an example technique performed by a wavetable synthesizer with respect to a double buffer, in accordance with some aspects of the present disclosure.

FIG. 11 illustrates an example double buffer employed by a wavetable synthesizer, in accordance with some aspects of the present disclosure. As illustrated in FIG. 11, a double buffer 1100 may include a first memory position 1102 and a second memory position 1104. As described in detail herein, a noise synthesizer (e.g., the noise synthesizer 802) may receive the plurality of control information 1004(1)-(*n*) and generate the plurality of scaled wavetables 1008(1)-(N). Further as illustrated in FIG. 1, the wavetable synthesizer (e.g., the wavetable synthesizer 806) may be configured to store the first scaled wavetable 1008(1) within the first memory position 1102 and the second scaled wavetable in the second memory position 1104 at a first period in time corresponding to the linear crossfading of the first scaled wavetable and the second scaled wavetable. Further, at a second period in time corresponding to the linear crossfading of the second scaled wavetable and a third scaled wavetable, the wavetable synthesizer may be configured to overwrite the first scaled wavetable 1008(1) within the first memory position 1102 with the third scaled wavetable in the first memory position 1102.

Figure 12B:
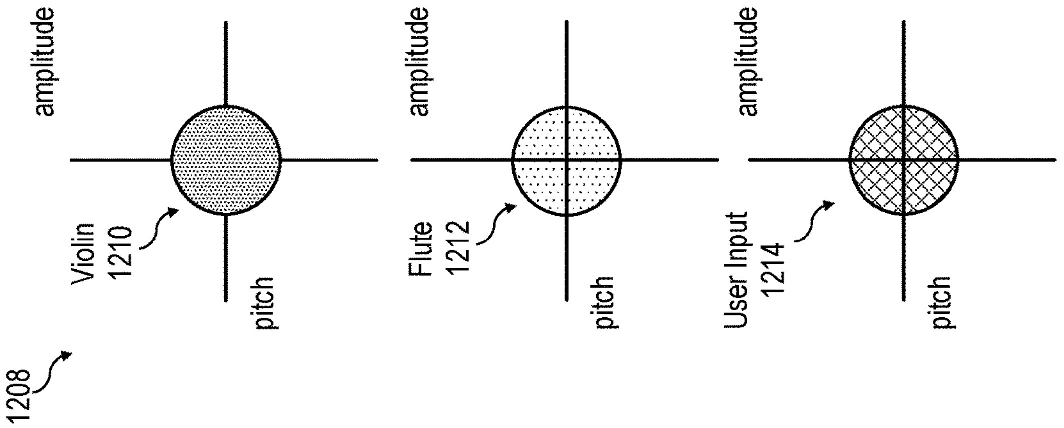
FIG. 12B illustrates a graph including standardized pitch-amplitude relationships of different instruments, in accordance with some aspects of the present disclosure.
Figure 12A:
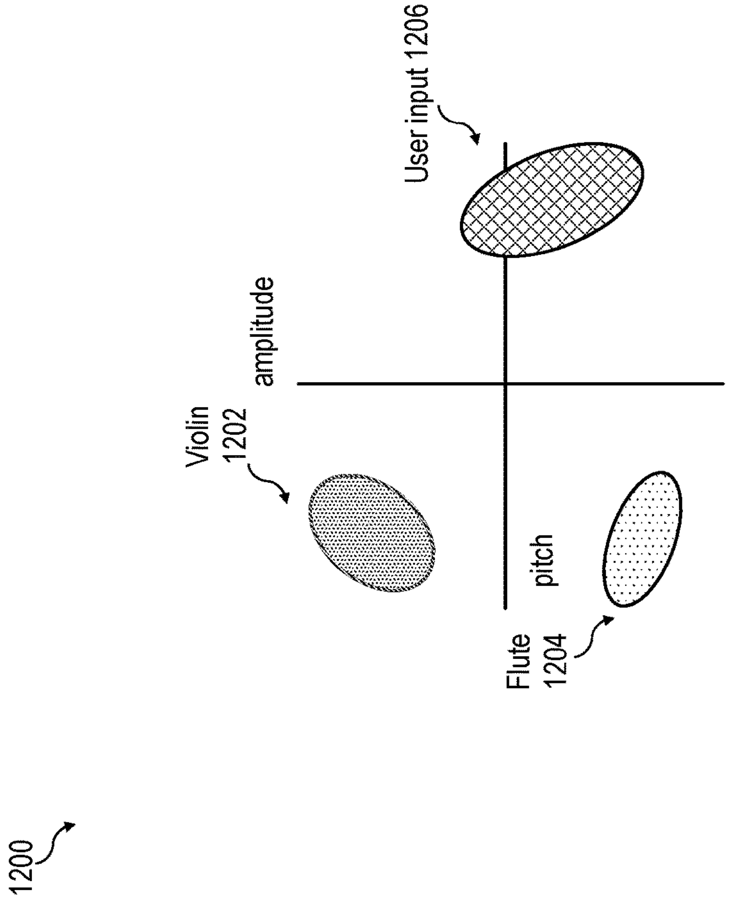
FIG. 12A illustrates a graph including pitch-amplitude relationships of instruments, in accordance with some aspects of the present disclosure.

FIG. 12A illustrates a graph including pitch-amplitude relationships of different instruments, in accordance with some aspects of the present disclosure. Typically, ML models trained on different datasets will have different minimum, maximum and average values. In other words, in some instances, each instrument may have different model, and one or more model parameters may synthesize quality sounds for a first model (e.g., flute) while having a lower quality on another model (e.g., violin). As illustrated in FIG. 12A, a violin may have a first pitch-amplitude relationship 1202, a flute may have a second pitch-amplitude relationship 1204, and user input may have a third pitch-amplitude relationship 1206 that differs from the pitch-amplitude relationship of the violin and flute.

FIG. 12B illustrates a graph including standardized pitch-amplitude relationships of different instruments, in accordance with some aspects of the present disclosure. In some aspects, instead of training directly on amplitude and pitch data of a particular instrument, a ML model (e.g., the ML model 104) may be trained using a dataset standardized to have a mean of 0 and standard deviation of 1. Accordingly, the dataset for each instrument may be standardized. Consequently, during real-time inference by the ML model, a user may employ transpose and amplitude expression controls to change the shape of the user input distribution to match the standard distribution by the above-described data whitening process. Further, when the user changes to a ML model of another instrument, the distribution is still aligned with one expected by the model. Additionally, in some aspects, the user offset midi 404 and user offset db 406 may be employed to move the pitch and amplitude within or outside the boundaries illustrated in FIG. 12B.

EXAMPLE PROCESSES

The processes described in FIG. 13 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the synthesis module 100. By way of example and not limitation, the method 1300 is described in the context of FIGS. 1-12 and 14. For example, the operations may be performed by one or more of the synthesis module 100, the feature detector 102, the ML model 104, the synthesis processor 106, the feature detector 102, the ML model 104, the synthesis processor 106, pitch detector 302, amplitude detector 304, latency compensation module 312, amplitude modification control module 702, ML model 704, noise synthesizer 802, pitch smoother 804, wavetable synthesizer 806, mix control 808, latency compensation module 810

Figure 13:
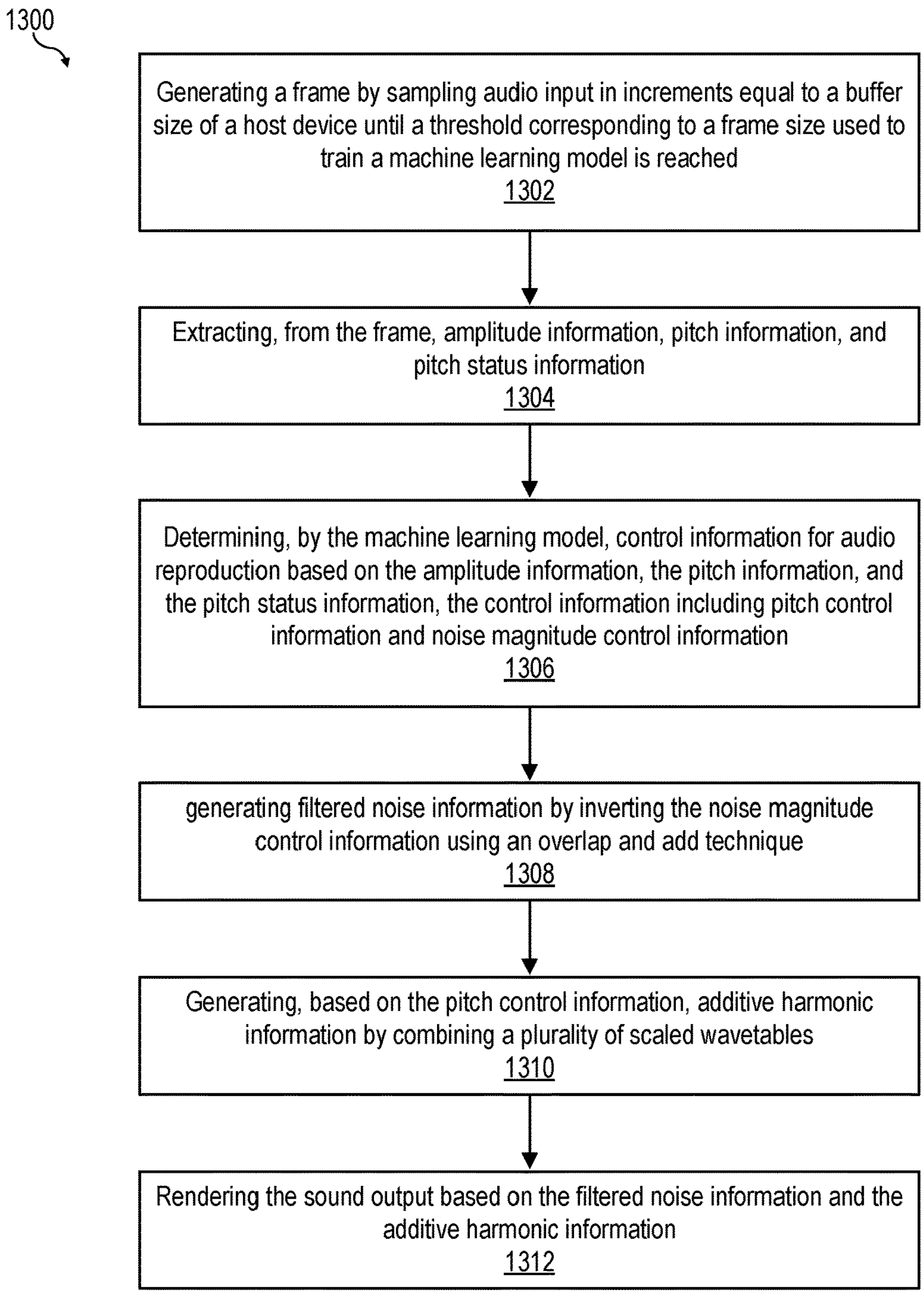
FIG. 13 is a flow diagram illustrating an example method for real-time synthesis of audio using neural network and DDSP processors, in accordance with some aspects of the present disclosure.

FIG. 13 is a flow diagram illustrating an example method for real-time synthesis of audio using neural network and DDSP processors, in accordance with some aspects of the present disclosure.

At block 1302, the method 1300 may include generating a frame by sampling audio input in increments equal to a buffer size of a host device until a threshold corresponding to a frame size used to train a machine learning model is reached. For example, the ML model 104 may be configured with a frame size equaling 480 samples, and the I/O buffer size of the device 101 may be 128 samples. As a result, the synthesis module 100 may sample the audio input 108 within the buffers 204 of the device, generate a frame including the data from the 1st sample of the first buffer 204(1) to the 36th sample of the fourth buffer 204(4), and provide the frame to feature detector 102. Further, the synthesis module 100 may repeat the frame generation step in real-time as the audio input is received by the device 101.

Accordingly, the device 101, the computing device 1400, and/or the processor 1401 executing the synthesis module 100 may provide means for generating a frame by sampling audio input in increments equal to a buffer size of a host device until a threshold corresponding to a frame size used to train a machine learning model is reached.

At block 1304, the method 1300 may include extracting, from the frame, amplitude information, pitch information, and pitch status information. For example, the feature detector 102 may be configured to detect the feature information 112. In some aspects, the pitch detector 302 of the feature detector 102 may be configured to determine pitch status information 306 (is_pitched) and pitch information 308 (midi_pitch), and the amplitude detector 304 of the feature detector 102 may be configured to determine amplitude information 310 (amp_ratio). Further, the downsampler 402 may be configured to downsample the feature information 112 before the feature information 112 is provided to the ML model 104. In some aspects, the feature information maybe downsampled to align with a specified interval of the ML model 104 for predicting the control information. As an example, if the sample rate of the device 101 is equal to 48000 Hz and ML model is trained with 250 frames per second, the downsampler 402 may provide every 192nd sample to the next subsystem as 48,000 divided 250 equals 192.

Accordingly, the device 101, the computing device 1400, and/or the processor 1401 executing the feature detector 102, the pitch detector 302, the amplitude detector 304, and/or the downsampler 402 may provide means for extracting, from the frame, amplitude information, pitch information, and pitch status information.

At block 1306, the method 1300 may include determining, by the machine learning model, control information for audio reproduction based on the amplitude information, the pitch information, and the pitch status information, the control information including pitch control information and noise magnitude control information. For example, the ML model 104 may receive the feature information 112(1) from the downsampler 402, and generate corresponding control information 114(1) based on the amplitude information, the pitch information, and the pitch status information detected by the feature detector 102. In some aspects, the control information 114(1) may include the pitch status information 306, the fundamental frequency in Hz 436, the harmonic distribution 430, the harmonic amplitude 432, and noise magnitude information 434. Further, the control information 114(1) provide independent control over pitch and loudness during synthesis.

Accordingly, the device 101, the computing device 1400, and/or the processor 1401 executing the ML model 104 may provide means for determining, by the machine learning model, control information for audio reproduction based on the amplitude information, the pitch information, and the pitch status information, the control information including pitch control information and noise magnitude control information.

At block 1308, the method 1300 may include generating filtered noise information by inverting the noise magnitude control information using an overlap and add technique. For example, the noise synthesizer 802 may receive the noise magnitude information 434 and generate the noise audio component 812 of the audio output based on the noise magnitude information 434. In addition, the noise synthesizer 802 may employ an overlap and add technique to generate the noise audio component 812 (i.e., the filtered noise information) at a size equal to the buffer size of device 101. In some aspects, the noise synthesizer 802 may perform the overlap and add technique via a circular buffer.

Accordingly, the device 101, the computing device 1400, and/or the processor 1401 executing the synthesis processor 106 and/or the noise synthesizer 802 may provide means for generating filtered noise information by inverting the noise magnitude control information using an overlap and add technique.

At block 1310, the method 1300 may include generating, based on the pitch control information, additive harmonic information by combining a plurality of scaled wavetables. For example, the pitch smoother 804 may be configured to receive the pitch status information 306 and the fundamental frequency in Hz 436, and generate a smooth foundation frequency in Hz 814. Further, the pitch smoother 804 may provide the smooth fundamental frequency in Hz 814 to the wavetable synthesizer 806. Upon receipt of the smooth foundation frequency in Hz 436, harmonic distribution 430, and harmonic amplification 432, the wavetable synthesizer 806 may be configured to convert, via a fast Fourier transformation (FFT), the harmonic distribution 430 into a first dynamic wavetable, scale the first wavetable to generate a first scaled wavetable based on multiplying first wavetable by the harmonic amplitude 432, and linearly crossfade the first scaled wavetable with a second scaled wavetable associated with the frame preceding the current frame and a third scaled wavetable associated with the frame succeeding the current frame to generate the harmonic audio component 816 (i.e., the additive harmonic information).

Accordingly, the device 101, the computing device 1400, and/or the processor 1401 executing the synthesis processor 106 and/or the wavetable synthesizer 806 may provide means for generating, based on the pitch control information, additive harmonic information by combining a plurality of scaled wavetables.

At block 1312, the method 1300 may include rendering the sound output based on the filtered noise information and the additive harmonic information. For example, the latency compensation module 810 may shift the noise audio component 812 and/or the harmonic audio component 816 so that the noise audio component 812 and/or the harmonic audio component 816 are properly aligned, and combine the noise audio component 812 and the harmonic audio component 816 to form the audio output 110. Once the audio output 110 is rendered, the audio output 110 may be reproduced via a speaker. As described herein, in some examples, the latency compensation module 810 may combine the noise audio component 812 and the harmonic audio component 816 to form an audio output 110 associated with an instrument differing from the instrument that produced the audio input 108. In some other examples, the latency compensation module 810 may combine the noise audio component 812 and the harmonic audio component 816 to form an audio output 110 of one or more notes of an instrument based on one or more samples of other notes of the instrument captured within the audio input 108.

In some examples, the latency compensation module 810 may receive the noise audio component 812 and/or the harmonic audio component 816 from the noise synthesizer 802 and the wavetable synthesizer 806 via the mix control 808. Further, in some aspects, the mix control 808 may modify the volume of the noise audio component 812 and/or the harmonic audio component 816 in a real-time safe manner based on user input.

Accordingly, the device 101, the computing device 1400, and/or the processor 1401 executing the synthesis processor 106 and/or the latency compensation module 810 may provide means for rendering the sound output based on the filtered noise information and the additive harmonic information.

While the operations are described as being implemented by one or more computing devices, in other examples various systems of computing devices may be employed. For instance, a system of multiple devices may be used to perform any of the operations noted above in conjunction with each other.

Illustrative Computing Device

Figure 14:
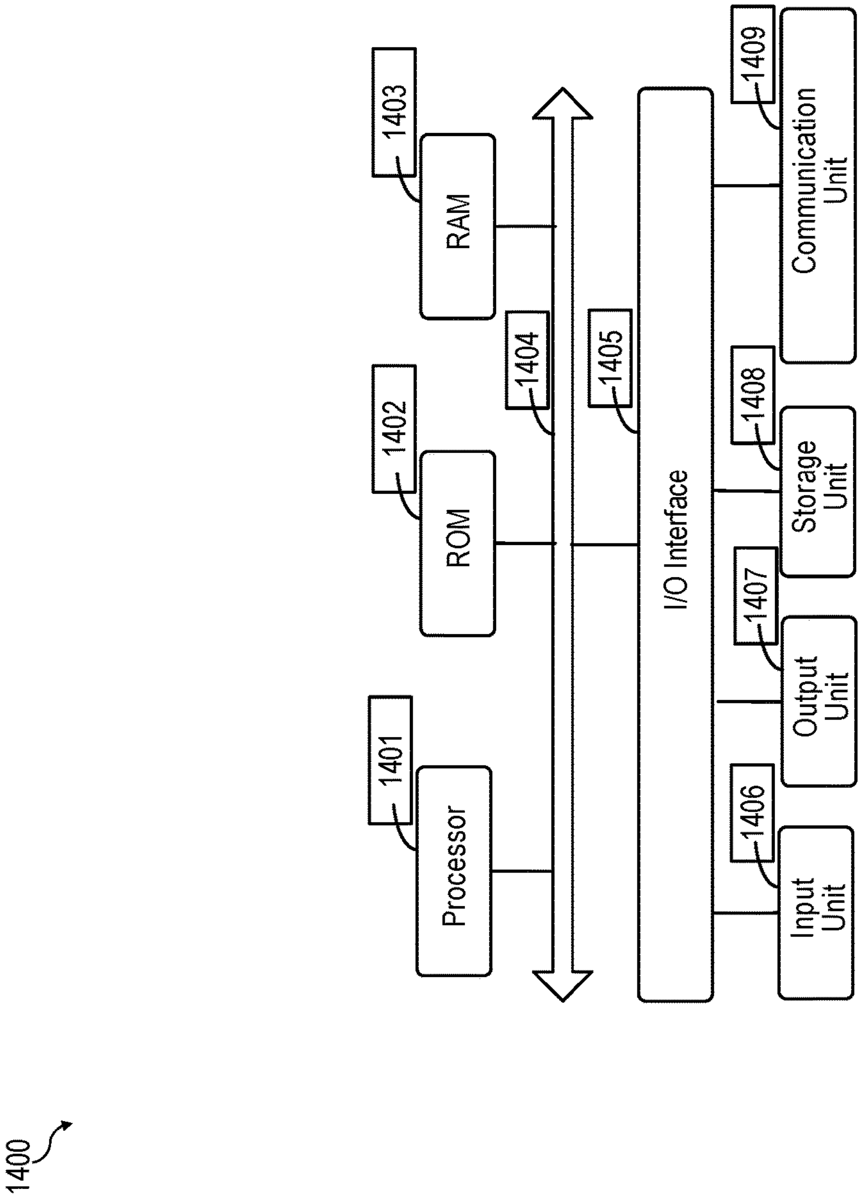
FIG. 14 is a block diagram illustrating an example of a hardware implementation for a computing device(s), in accordance with some aspects of the present disclosure.

FIG. 14 illustrates a block diagram of an example computing system/device 1400 (e.g., device 101) suitable for implementing example embodiments of the present disclosure. The synthesis module 100 may be implemented as or included in the system/device 1400. The system/device 1400 may be a general-purpose computer, a physical computing device, or a portable electronic device, or may be practiced in distributed cloud computing environments where tasks are performed by remote processing devices that are linked through a communication network. The system/device 1400 can be used to implement any of the processes described herein.

As depicted, the system/device 1400 includes a processor 1401 which is capable of performing various processes according to a program stored in a read only memory (ROM) 1402 or a program loaded from a storage unit 1408 to a random-access memory (RAM) 1403. In the RAM 1403, data required when the processor 1401 performs the various processes or the like is also stored as required. The processor 1401, the ROM 1402 and the RAM 1403 are connected to one another via a bus 1404. An input/output (I/O) interface 1405 is also connected to the bus 1404.

The processor 1401 may be of any type suitable to the local technical network and may include one or more of the following: general purpose computers, special purpose computers, microprocessors, digital signal processors (DSPs), graphic processing unit (GPU), co-processors, and processors based on multicore processor architecture, as non-limiting examples. The system/device 1400 may have multiple processors, such as an application-specific integrated circuit chip that is slaved in time to a clock which synchronizes the main processor.

A plurality of components in the system/device 1400 are connected to the I/O interface 1405, including an input unit 1406, such as a keyboard, a mouse, microphone (e.g., an audio capture device for capturing the audio input 108) or the like; an output unit 1407 including a display such as a cathode ray tube (CRT), a liquid crystal display (LCD), or the like, and a speaker or the like (e.g., a speaker for reproducing the audio output 110); the storage unit 1408, such as disk and optical disk, and the like; and a communication unit 1409, such as a network card, a modem, a wireless transceiver, or the like. The communication unit 1409 allows the system/device 1400 to exchange information/data with other devices via a communication network, such as the Internet, various telecommunication networks, and/or the like.

The methods and processes described above, such as the method 1300, can also be performed by the processor 1401. In some embodiments, the method 1300 can be implemented as a computer software program or a computer program product tangibly included in the computer readable medium, e.g., storage unit 1408. In some embodiments, the computer program can be partially or fully loaded and/or embodied to the system/device 1400 via ROM 1402 and/or communication unit 1409. The computer program includes computer executable instructions that are executed by the associated processor 1401. When the computer program is loaded to RAM 1403 and executed by the processor 1401, one or more acts of the method 1300 described above can be implemented. Alternatively, processor 1401 can be configured via any other suitable manners (e.g., by means of firmware) to execute the method 1300 in other embodiments.

CONCLUSION

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A method of audio processing comprising:

generating a frame by sampling audio input in increments, which are based on a first buffer size associated with an input/output buffer of a host device, until a threshold buffer size, corresponding to a frame size used to train a machine learning model, is reached, wherein the first buffer size does not match the threshold buffer size;

extracting, from the frame, amplitude information, pitch information, and pitch status information;

determining, by the machine learning model, control information for audio reproduction based on the amplitude information, the pitch information, and the pitch status information, the control information including pitch control information and noise magnitude control information;

generating filtered noise information by inverting the noise magnitude control information using an overlap and add technique, including:

receiving the noise magnitude control information according to the frame size from the machine learning model;

rendering the filtered noise information in a block size not equal to the frame size;

writing, via the overlap and add technique, the filtered noise information to a circular buffer; and reading, in the first buffer size, the filtered noise information from the circular buffer;

generating, based on the pitch control information, additive harmonic information by combining a plurality of scaled wavetables; and rendering audio output based on the filtered noise information and the additive harmonic information.

2. The method of claim 1, further comprising applying latency compensation to the amplitude information, the pitch information, and the pitch status information prior to determining the control information.

3. The method of claim 1, wherein the frame is a first frame, the pitch control information includes harmonic distribution information, and harmonic amplitude information, and generating the additive harmonic information comprises:

converting, via a fast Fourier transformation, the harmonic distribution information into a first dynamic wavetable;

determining a first scaled wavetable of the plurality of scaled wavetables based on the harmonic amplitude information and the first dynamic wavetable; and linearly crossfading the first scaled wavetable with a second scaled wavetable of the plurality of scaled wavetables, the second scaled wavetable associated with a second frame.

4. The method of claim 3, wherein the plurality of scaled wavetables are stored in a double buffer having a first memory position storing the first scaled wavetable and a second memory position storing the second scaled wavetable and configured to overwrite the first scaled wavetable in the first memory position with a third scaled wavetable of the plurality of scaled wavetables based on a portion of the audio output corresponding to the first scaled wavetable being reproduced.

5. The method of claim 3, wherein determining the first scaled wavetable comprises:

determining the first scaled wavetable based at least in part by filtering first wavetable above a detected pitch within the pitch information.

6. The method of claim 1, further comprising applying latency compensation to the filtered noise information and the additive harmonic information prior to rendering the audio output.

7. The method of claim 1, wherein the pitch control information includes harmonic distribution information, and the determining the control information for the audio reproduction comprises:

determining that the pitch status information indicates that the audio input is not pitched; and zeroing the harmonic distribution information based on the pitch status information.

8. The method of claim 1, wherein determining the control information for the audio reproduction comprises:

determining the control information based on a model sample rate used to train the machine learning model;

determining a target sample rate of the host device; and removing a portion of the pitch control information and/or the noise magnitude control information in excess of the target sample rate based on the target sample rate being less than the model sample rate.

9. The method of claim 1, further comprising:

receiving, via a user interface, a mix input value indicating a relationship for mixing the filtered noise information and the additive harmonic information within the audio output; and wherein rendering the audio output comprises smoothing a gain applied to the rendering of the audio output based on the mix input value.

10. The method of claim 1, further comprising modifying, based on user input, the amplitude information before determining the control information.

11. A non-transitory computer-readable device having instructions thereon that, when executed by at least one computing device, causes the at least one computing device to perform operations comprising:

generating a frame by sampling audio input in increments, which are based on a first buffer size associated with an input/output buffer of a host device, until a threshold buffer size, corresponding to a frame size used to train a machine learning model, is reached, wherein the first buffer size does not match the threshold buffer size;

extracting, from the frame, amplitude information, pitch information, and pitch status information;

determining, by the machine learning model, control information for audio reproduction based on the amplitude information, the pitch information, and the pitch status information, the control information including pitch control information and noise magnitude control information;

generating filtered noise information by inverting the noise magnitude control information using an overlap and add technique, including:

receiving the noise magnitude control information according to the frame size from the machine learning model;

rendering the filtered noise information in a block size not equal to the frame size:

writing, via the overlap and add technique, the filtered noise information to a circular buffer; and reading, in the first buffer size, the filtered noise information from the circular buffer;

generating, based on the pitch control information, additive harmonic information by combining a plurality of scaled wavetables; and rendering audio output based on the filtered noise information and the additive harmonic information.

12. The non-transitory computer-readable device of claim 11, wherein the operations further comprise applying latency compensation to the amplitude information, the pitch information, and the pitch status information prior to determining the control information.

13. The non-transitory computer-readable device of claim 11, wherein the frame is a first frame, the pitch control information includes harmonic distribution information, and harmonic amplitude information, and generating the additive harmonic information comprises:

converting, via a fast Fourier transformation, the harmonic distribution information into a first dynamic wavetable;

determining a first scaled wavetable of the plurality of scaled wavetables based on the harmonic amplitude information and the first dynamic wavetable; and linearly crossfading the first scaled wavetable with a second scaled wavetable of the plurality of scaled wavetables, the second scaled wavetable associated with a second frame.

14. The non-transitory computer-readable device of claim 11, wherein the instructions further comprise applying latency compensation to the filtered noise information and the additive harmonic information prior to rendering the audio output.

15. The non-transitory computer-readable device of claim 11, wherein determining the control information for the audio reproduction comprises:

determining the control information based on a model sample rate used to train the machine learning model;

determining a target sample rate of the host device; and removing a portion of the pitch control information and/or the noise magnitude control information in excess of the target sample rate based on the target sample rate being less than the model sample rate.

16. A system comprising:

an audio capture device;

a speaker, a memory storing instructions thereon; and at least one processor coupled with the memory and configured by the instructions to:

capture audio input via the audio capture device, generate a frame by sampling the audio input in increments, which are based on a first buffer size associated with an input/output buffer of a host device, until a threshold buffer size, corresponding to a frame size used to train a machine learning model, is reached, wherein the first buffer size does not match the threshold buffer size;

extract, from the frame, amplitude information, pitch information, and pitch status information;

determine, by the machine learning model, control information for audio reproduction based on the amplitude information, the pitch information, and the pitch status information, the control information including pitch control information and noise magnitude control information;

filter the noise magnitude control information using an overlap and add technique to generate filtered noise information, including receiving the noise magnitude control information according to the frame size from a machine learning model:

rendering the filtered noise information in a block size not equal to the frame size:

writing, via the overlap and add technique, the filtered noise information to a circular buffer; and reading, in the first buffer size, the filtered noise information from the circular buffer:

generate, based on the pitch control information, additive harmonic information by combining a plurality of scaled wavetables;

render audio output based on the filtered noise information and the additive harmonic information; and reproduce the audio output via the speaker.

17. The system of claim 16, wherein the frame is a first frame, the pitch control information includes harmonic distribution information and harmonic amplitude information, and to generate the additive harmonic information, the at least one processor is further configured by the instructions to:

convert, via a fast Fourier transformation, the harmonic distribution information into a first dynamic wavetable;

determine a first scaled wavetable of the plurality of scaled wavetables based on the harmonic amplitude information and the first dynamic wavetable; and linearly crossfade the first scaled wavetable with a second scaled wavetable of the plurality of scaled wavetables, the second scaled wavetable associated with a second frame.

* * * * *